US012610197B2

(12) United States Patent
Giusti et al.

(10) Patent No.: US 12,610,197 B2
(45) Date of Patent: Apr. 21, 2026

(54) MEMS TRANSDUCER DEVICE FOR HIGH-FREQUENCY APPLICATIONS, AND MANUFACTURING METHOD

(71) Applicant: STMICROELECTRONICS S.r.l., Agrate Brianza (IT)

(72) Inventors: Domenico Giusti, Caponago (IT); Fabio Quaglia, Pizzale (IT); Marco Ferrera, Concorezzo (IT); Carlo Luigi Prelini, Seveso (IT); Alessandro Stuart Savoia, Rome (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 249 days.

(21) Appl. No.: 18/513,248

(22) Filed: Nov. 17, 2023

(65) Prior Publication Data

US 2024/0179475 A1 May 30, 2024

(30) Foreign Application Priority Data

Nov. 25, 2022 (IT) ........................ 102022000024411

(51) Int. Cl.
*H04R 17/02* (2006.01)
*H04R 31/00* (2006.01)

(52) U.S. Cl.
CPC ........... *H04R 17/02* (2013.01); *H04R 31/006* (2013.01); *H04R 2201/003* (2013.01); *H04R 2400/01* (2013.01)

(58) Field of Classification Search
CPC ...... H04R 19/013; H04R 31/006; H04R 1/02; H04R 9/005; H04R 2201/003; H04R 2201/029; H04R 9/048; H04R 17/02; H04R 2400/01; B81C 1/00238; B81C 2203/0792; B81C 1/00658; B81C 1/00301; G02B 26/101; G02B 26/0833; G02B 26/0858; G01B 7/22; H01L 25/18; B81B 3/007; B81B 2207/096; B81B 2207/012; B81B 2203/0127; B81B 2201/0271; B06B 1/06
(Continued)

(56) References Cited

U.S. PATENT DOCUMENTS 10,703,102 B2 7/2020 Giusti et al.
10,785,576 B1 * 9/2020 Nakao .................. B81B 7/0061
(Continued)

FOREIGN PATENT DOCUMENTS

EP 3599217 A1 1/2020

*Primary Examiner* — Carolyn R Edwards
*Assistant Examiner* — Julie X Dang
(74) *Attorney, Agent, or Firm* — Seed IP Law Group LLP

(57) ABSTRACT

MEMS device comprising: a signal processing assembly; a transduction module comprising a plurality of transducer devices; a stiffening structure at least partially surrounding each transducer device; one or more coupling pillars for each transducer device, extending on the stiffening structure and configured to physically and electrically couple the transduction module to the signal processing assembly, to carry control signals of the transducer devices. Each conductive coupling element has a section having a shape such as to maximize the overlapping surface with the stiffening structure around the respective transducer device. This shape includes hypocycloid with a number of cusps equal to or greater than three; triangular; quadrangular.

20 Claims, 9 Drawing Sheets

(58) Field of Classification Search
USPC ........ 381/174, 175, 113, 104, 190, 191, 182
See application file for complete search history.

(56) References Cited

U.S. PATENT DOCUMENTS

| | | | | |
|---|---|---|---|---|
| 2013/0094684 | A1* | 4/2013 | Ehrenpfordt | B81C 1/0023 29/832 |
| 2015/0230029 | A1* | 8/2015 | Hong | H04R 23/00 381/396 |
| 2015/0266723 | A1* | 9/2015 | Chan | H04R 1/08 257/416 |
| 2016/0241965 | A1* | 8/2016 | Chau | B81B 3/0021 |
| 2019/0290243 | A1* | 9/2019 | Bryzek | G01S 15/8938 |
| 2020/0035654 | A1* | 1/2020 | Chen | H10N 30/88 |
| 2024/0205611 | A1 | 6/2024 | Giusti et al. | |

* cited by examiner

MEMS TRANSDUCER DEVICE FOR HIGH-FREQUENCY APPLICATIONS, AND MANUFACTURING METHOD

BACKGROUND

Technical Field

The present disclosure relates to a micro-electro-mechanical (MEMS) device, in particular to an electro-acoustic transducer device, and to a manufacturing method of the micro-electro-mechanical device.

Description of the Related Art

As is known, numerous ultrasonic sensors are currently available, which are for transmitting and receiving acoustic waves with frequencies higher than 20 kHz. Typically, an ultrasound sensor comprises an electro-acoustic transducer and circuitry for driving the transducer, as well as for amplifying the electrical signals generated by the same transducer following the reception of acoustic echo signals. The transducer therefore acts as both an acoustic emitter and an acoustic receiver during different time periods.

Referring to stimulus acoustic signals and response acoustic signals to indicate, respectively, acoustic signals (or beams) transmitted by the transducer and acoustic signals (or beams) impinging on the transducer, for example, following the reflection of the stimulus acoustic signals by an obstacle, the need is known, for example, in the ultrasound field, to be able to focus the stimulus acoustic signals. In order to control the emission of stimulus acoustic signals into space, the technique is known which provides for having a plurality of transducers, each of which emits spherical acoustic waves, and for controlling these transducers with drive signals suitably phase-shifted with each other, so that the sum of the stimulus acoustic signals generated by the transducers forms an acoustic beam having the desired spatial distribution.

This having been said, in order to increase performances, in particular as regards echo amplification, the transducers, typically formed by corresponding MEMS devices arranged according to a matrix, need to be arranged as close as possible to the electronic circuitry, and in particular to the part of electronic circuitry responsible for amplifying the electrical signals generated by the transducers. However, this need clashes with the high number of transducers (in the order of thousands) typically used.

In practice, since each transducer is coupled to a respective application-specific integrated circuit (ASIC), which forms the driver circuit and the receiver associated with the transducer, thousands of connections present between the transducers and the ASIC circuits connected thereto need to be dealt with, by controlling the delays introduced by the different channels (each channel being understood as formed by a transducer, the corresponding driver circuit and the corresponding receiver), as well as the jitter present between the different channels.

This having been said, manufacturing processes are currently known which provide for processing a first and a second semiconductive wafer, so as to form, in the first wafer, a plurality of transducers, as well as to form, in the second wafer, a plurality of ASIC circuits. Subsequently, the first and the second wafers are coupled to each other, such that the transducers are coupled to the corresponding ASIC circuits. This process, however, is characterized by a reduced flexibility, since it provides for the adoption of a single manufacturing technology for both the driver circuits and the reception circuits. Furthermore, this manufacturing process does not allow the ASIC circuits to be tested until the same process has been ended. Again, this manufacturing process requires that the pitch of the electrical connection pads in the first and the second wafers be the same.

The patent document EP3599217 discusses that, to increase the performances and in particular as regards the echo amplification, it is advisable that the transducers, (typically formed by corresponding MEMS devices arranged according to a matrix) are arranged as close as possible to the electronic circuitry, and in particular to the part of the electronic circuitry which has the function of amplifying the electrical signals generated by the transducers. The authors of this patent document provide a manufacturing process for MEMS devices which partially overcomes the drawbacks of the prior art.

However, the known manufacturing process does not allow to manufacture broadband PMUTs above 4 MHz due to some process limitations, including for example the minimum cavity-cavity distance and the minimum thickness of the membrane.

BRIEF SUMMARY

The present disclosure is directed to providing a MEMS device and a manufacturing method of the MEMS device, to at least partially overcome the drawbacks of the prior art.

A MEMS device of the present disclosure may be summarized as including: a signal processing assembly; a transduction module including a plurality of transducer devices mutually arranged to form an arrangement pattern of transducer devices adjacent to each other and separated from each other by surface regions of the transduction module; a stiffening structure at said surface regions of the transduction module, at least partially surrounding each transducer device of said plurality of transducer devices; a plurality of conductive coupling elements extending on the stiffening structure and configured to physically and electrically couple the transduction module to the signal processing assembly, each conductive coupling element being physically separated and electrically insulated from the other conductive coupling elements; and a plurality of first conductive tracks, each of them electrically connected to a transducer device and to a respective conductive coupling element, characterized in that said conductive coupling elements have a respective section with a shape such as to maximize the overlapping surface with the stiffening structure about the respective transducer device.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein:

FIGS. 5A-5M illustrate manufacturing steps of the MEMS device of FIG. 1A.

DETAILED DESCRIPTION

Figure 1A:
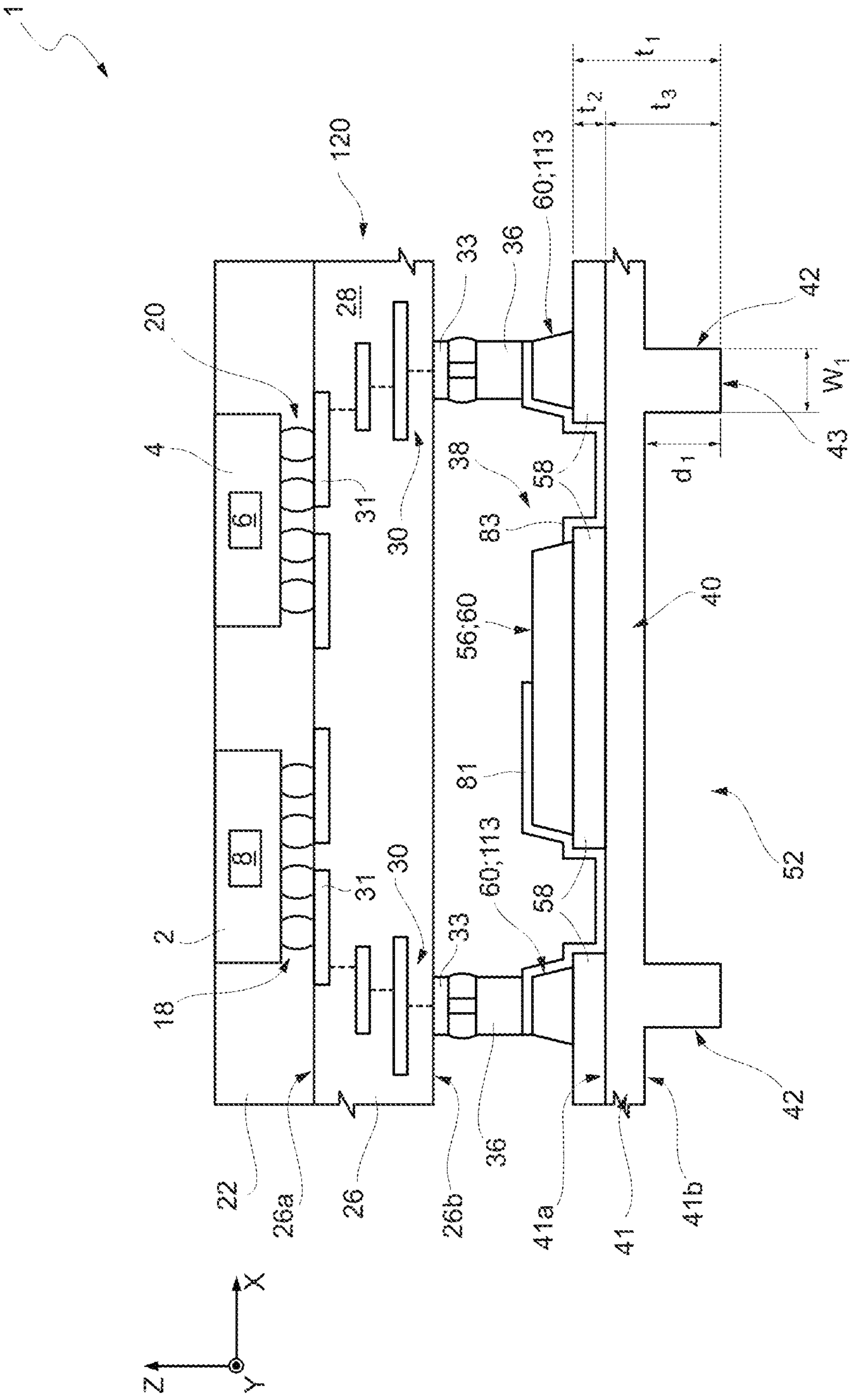
FIG. 1A schematically shows a cross-section of a MEMS device for electroacoustic transductions, in particular a PMUT.

FIG. 1A shows a portion of a MEMS device 1, particularly an electroacoustic device, even more particularly an ultrasonic transducer device (PMUT), in a triaxial system of axes X, Y, Z orthogonal to each other. The view of FIG. 1A is in-section on the XZ plane.

Figure 1B:
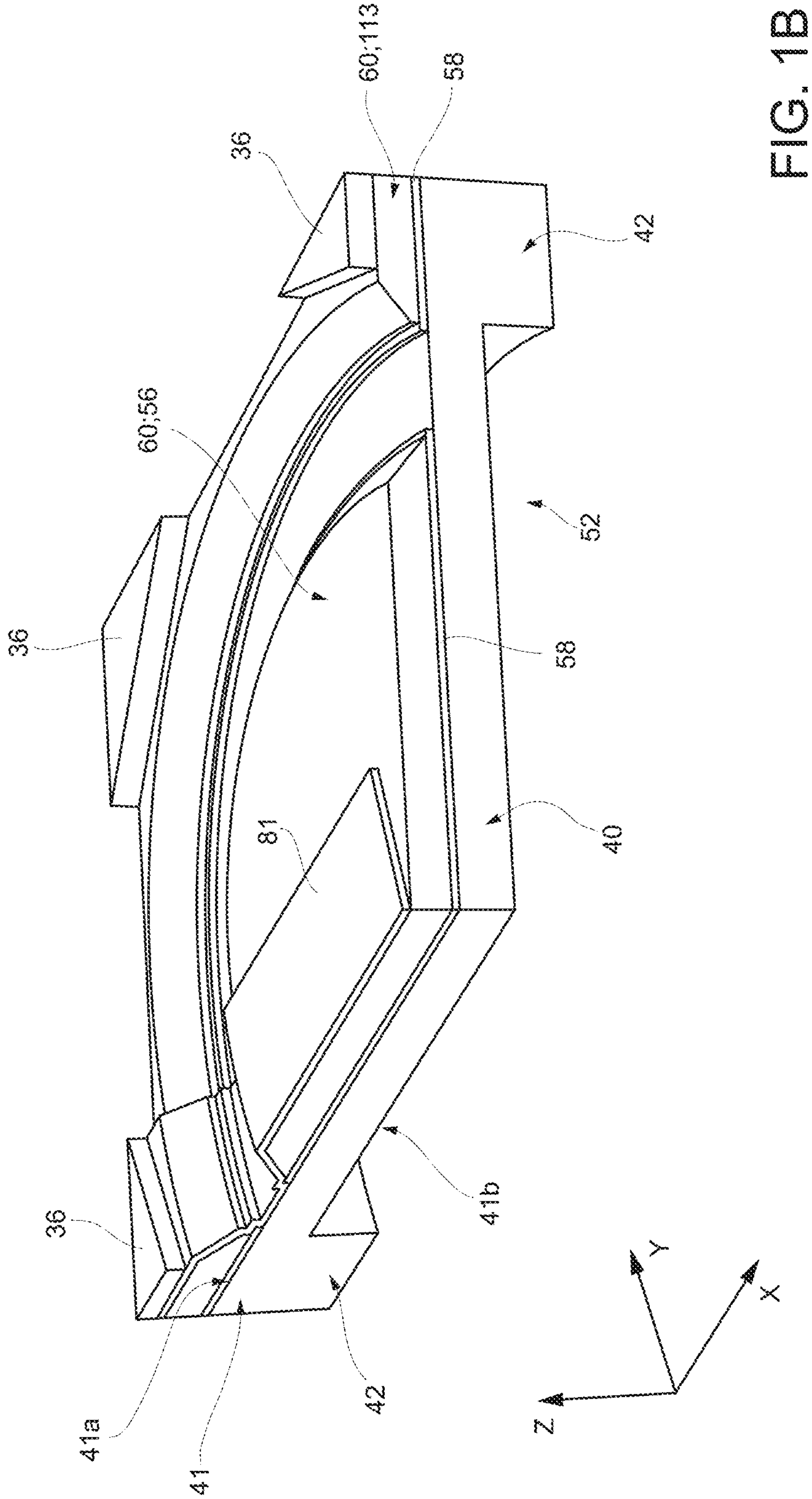
FIG. 1B schematically shows a perspective view of a portion of the MEMS device of FIG. 1A.

FIG. 1B shows in perspective view a detail of the MEMS device 1 of FIG. 1A (some elements are not present, for simplicity of representation and better clarity), in the triaxial system XYZ.

Elements common between FIGS. 1A-1B are identified with the same reference numerals.

With joint reference to FIGS. 1A and 1B, the electroacoustic device 1 comprises a first and a second die 2, 4, having a first and a second integrated circuit 6, 8, respectively, formed therein, formed for example by known ASIC circuits. Each of the first and the second integrated circuits 6, 8 comprises a respective transmission circuit and a respective reception circuit of respective actuation and detection signals. The transmission circuit is configured to generate and transmit a control signal (actuation) of an actuator or transducer of the device 1; the reception circuit is configured to receive and process a signal transduced by a transducer of the device 1. In some embodiments, one of the transmission circuit and the reception circuit may be absent.

In each of the first and the second integrated circuits 6, 8, the corresponding transmission and reception circuits are electrically connected to a corresponding plurality of metal "bumps", indicated by 18 and 20, respectively, and also known as microbumps. Again, in a per se known manner, the bumps 18, 20 are electrically connected to metallizations of the corresponding dice 2, 4, for example through respective electric contact pads.

The electroacoustic device 1 also comprises a coating region 22, which is formed for example by an epoxy resin and incorporates the first and the second dice 2, 4.

The electroacoustic device 1 further comprises a redistribution structure 26, which comprises a dielectric region 28 which accommodates a plurality of conductive paths 30 (shown qualitatively). The plurality of conductive paths 30 includes one or more conductive layers and one or more conductive vias that define the plurality of conductive paths 30. The redistribution structure 26 is delimited by a first and a second side 26*a*, 26*b* opposite to each other along the Z axis. The conductive paths 30 extend between the first and the second sides 26*a*, 26*b* and are accessible at the first and the second sides 26*a*, 26*b*. At the sides 26*a*, 26*b* conductive pads 31, 33 are present having the various conductive paths 30 electrically connected thereto. The dielectric region 28 is formed, for example, by polyimide (or, for example, polyamide or a resin with glass fibers). The conductive paths 30 are typically of metal material, such as for example copper.

The electroacoustic device 1 further comprises a plurality of pillars 36 of metal material (for example of gold, or copper, or tin or other metal material).

The electroacoustic device 1 further comprises a transduction module or structure 38 electrically and physically coupled to the redistribution structure 26 by the pillars 36.

The transduction structure 38 comprises a structural body 41 having a first surface 41*a* opposite to a second surface 41*b*. The structural body 41 comprises, as better described below, one or more semiconductor material layers alternating with one or more insulating material layers. In particular, the structural body 41 has, at the second surface 41*b*, thick, undeformable portions 42 separated from each other by a plurality of recesses 52. In other words, the structural body 41 has a thickness, along the Z axis, which is variable, including a first value $t_1$ at the thick portions 42 and a second value $t_2$ less than the first value $t_1$ (i.e., $t_2<t_1$) at the recesses 52.

The recesses 52 have an extension, along the Z axis, having a third thickness $t_3$, wherein the third thickness $t_3$ is within a range of 5 μm and 400 μm or equal to the upper and lower ends of this range. In other words, the dimension, along the Z axis, of each thick portion 42 is has the third thickness. The third thickness being equal to the first thickness $t_1$ minus the second thickness $t_2$ (i.e., $t_3=t_1-t_2$).

The recesses 52 have a depth di that extends from a respective end surface 43 of the thick portion 42 to the second surface 41*b*.

The extension, along the X axis, of each of the thick portions 42 is a width $w_1$ within a range of 10 to 30 μm, for example equal to 20 μm. In some embodiments, the width $w_1$ may be equal to the upper and lower ends of this range.

At the first surface 41*a* the pillars 36 extend, which protrude from the structural body 41 along the Z axis.

The portions of the structural body 41 having thickness $t_2$ (i.e., the portions suspended on corresponding recesses 52, between two adjacent thick portions 42) form respective membranes 40, while all of the thick regions 42 form a frame having the membranes 40 fixed thereto.

The membranes 40 may have a thickness $t_2$ comprised for example between 3 μm and 10 μm, in particular equal to about 4 μm.

The electroacoustic device 1 further comprises a plurality of transducers 56. In this context, the transducer 56 may be operated to generate a deflection of the respective membrane 40 or be used to detect a deformation of the respective membrane 40. By way of example, without thereby losing generality, only the operation of generating the deflection of the membrane will be considered hereinbelow and the transducers 56 will be referred to as actuators 56. The electroacoustic device 1 therefore comprises an actuator 56 for each membrane 40. Each actuator 56 extends on, and in contact with, the corresponding membrane 40. Each actuator 56 is integral with the respective membrane 40. An insulating layer 58, for example of silicon oxide, extends on the surface 41*a*, below each actuator 56. The insulating layer 58 contributes to thickening the respective membrane 40 and therefore this thickness is taken into account during the design step of the value $t_2$. In other words, the respective membrane 40 includes the insulating layer 58 and a respective portion of the structural body 41.

The membrane 40 and the respective actuator 56 form, as a whole, a transducer device, configured to transduce a received electrical signal (control signal) into a mechanical movement and, therefore, into an acoustic wave. The reverse transduction is, as said, possible, additionally or alternatively, according to the conditions of use of the electroacoustic device 1.

In greater detail, each actuator 56 comprises a stack 60, including a respective piezoelectric region (e.g., of PZT) and a pair of drive electrodes configured to bias the piezoelectric region in order to generate a corresponding deformation of the piezoelectric region.

Each actuator 56 is surrounded (partially or completely, in respective embodiments) by a stiffening structure 113, having the pillars 36 extending thereon. In one embodiment, the stiffening structure 113 is formed by the same stack 60 as the actuator 56, in order to simplify the process steps. However, it is apparent that the stiffening structure 113 may be of other materials, for example semiconductor or insulating materials, or a stack including such materials. The stiffening structure 113 has a thickness along the Z axis, comprised between 1 μm and 50 μm.

Each actuator 56 is electrically coupled, through respective conductive tracks 81, 83, to the pillars 36. Since in the case of a piezoelectric actuator two actuation electrodes (a top electrode and a bottom electrode with respect to the PZT layer) are provided, in a per se known manner, FIG. 1A illustrates a conductive track 81, 83 for each top and, respectively, bottom electrode. The conductive tracks 81, 83 partially extend on the membrane 40 laterally to the actuator 56, up to reaching and contacting the respective pillars 36 downwardly.

Through the conductive tracks 81, 83 and the pillars 36, each actuator 56 is electrically coupled to the conductive paths 30 of the redistribution structure 26 and, therefore, to corresponding bumps 18, 20 of the first and the second dice 2, 4. In this manner, each actuator 56 is for receiving electric control signals from the dice 2, 4, which cause corresponding deformations of the membrane 40 mechanically coupled to said actuator 56, with resulting generation of an acoustic wave; furthermore, the deformation of the membrane 40, due to the impingement (for example) of an acoustic echo signal thereon, causes a corresponding deformation of the actuator 56, which generates an electric response signal, which is sent and received by the reception circuit of the dice 2, 4, which may process it (and subsequently may provide a corresponding output signal to an external processor).

In one embodiment, each actuator 56 is connected to both the transmission circuit and the reception circuit of the corresponding die 2, 4.

In a further embodiment, the transmission and reception circuits of a die 2, 4 may manage multiple transducers 56.

Furthermore, in each die 2, 4, protection mechanisms of the reception circuit may be implemented, during the transmission step; alternatively, the transmission and reception signals may be conveyed to/from the actuator 56 through two different pillars 36.

In one embodiment of the present disclosure, each pillar 36 has a section (on the XY plane) with a shape of:

- hypocycloid with three cusps (FIG. 2A), also referred to as deltoid;
- hypocycloid with four cusps (FIG. 2B), also referred to as asteroid;
- triangle (FIG. 2C), in particular equilateral triangle or isosceles triangle; and
- quadrangular or diamond-like (FIG. 2D), i.e., a quadrilateral which has two pairs of consecutive, congruent sides, or a polygon which has four sides and which has two pairs of consecutive sides having the same measure; this polygon may also be concave or convex.

Figure 2B:
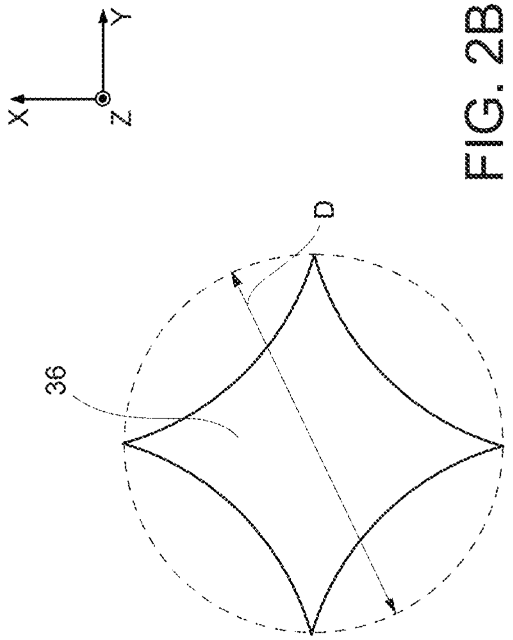
FIGS. 2A-2D illustrate sections of electrical coupling elements of the MEMS device of FIG. 1A and of FIG. 1B, according to respective embodiments.
Figure 2D:
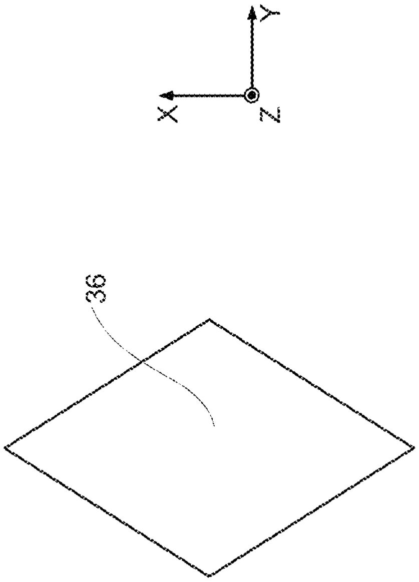
Figure 2A:
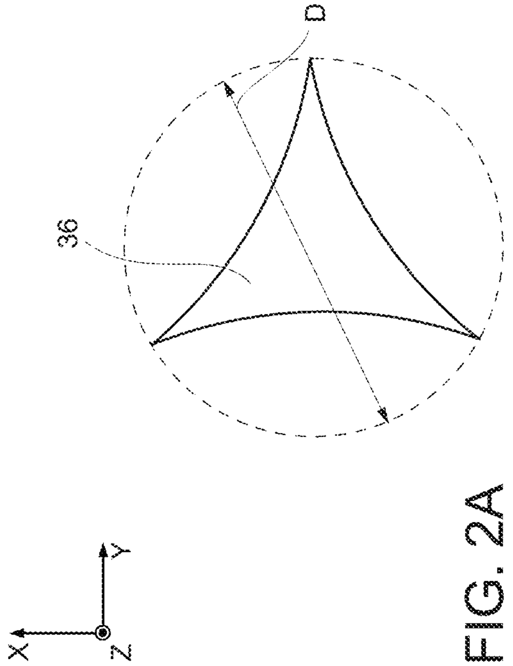

With reference to FIGS. 2A and 2B, it is observed that the hypocycloid is defined as the curve generated by a point of a circumference (i.e., represented by the dotted circles) which rolls on the inner part of another circumference. When the pillars 36 have this shape, in sectional view, the dimensions of the diameter D of the circumference which contains the relative hypocycloid are comprised between 3 μm and 100 μm. In other words, in this case, the pillars 36 have a maximum dimension, on the XY plane, comprised between the aforementioned diameter values.

Figure 2C:
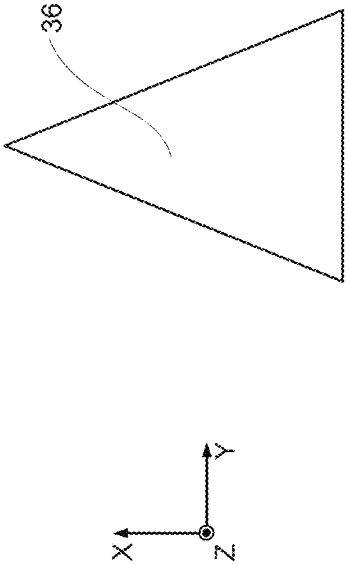

With reference to FIG. 2C, when the pillars 36 have a triangular section, the dimensions of this triangle may be chosen in such a way that it is inscribable in a circumference having a diameter identified with reference to FIGS. 2A and 2B. By way of further example, in the case of an equilateral triangle, it is designed with a side having a value comprised between 3 μm and 50 μm; in the case of an isosceles triangle, it is designed with base side having a value comprised between 3 μm and 50 μm; and height having a value comprised between 3 μm and 100 μm.

With reference to FIG. 2D, when the pillars 36 have a quadrangular section, the dimensions of this polygon may be chosen in such a way that it is inscribable in a circumference having a diameter identified with reference to FIGS. 2A and 2B. By way of further example, in the case of a square section of the pillars 36, the square section is designed with a side comprised between 3 μm and 50 μm; in the case of a section having the shape of a polygon with four sides and with two pairs of consecutive sides having the same measure, these sides have a measure comprised between 3 μm and 70 μm.

Each pillar 36 is therefore a solid having a uniform section throughout all its extension along the Z axis, and with a section having a shape chosen during the design step from among the previously listed shapes (FIGS. 2A-2D).

In general, the function of the pillars 36 is to increase the rigidity of the structure 38, in particular of the structural body 41. Therefore, the greater the spatial extension of the overlapping portions (in top view on the XY plane) between the pillars 36 and the structural body 41 (with the intermediate presence of the stiffening structure 113), the greater the stiffness increasing effect. In general, therefore, the shape of the pillars 36 may be chosen such as to maximize these overlapping portions between the pillars 36 and the stiffening structure 113 about each actuator 56/membrane 40.

In one embodiment, each actuator 56 is associated with only two pillars 36 (to carry the respective bias signals of the two top and bottom electrodes). In this case, one of these pillars 36 may have a shape chosen from the shapes mentioned above (FIGS. 2A-2D), and the other pillar 36 may have a generic polygonal or curvilinear shape which follows the outer profile of the respective actuator 56/membrane 40, to maximize its own overlapping portion with the structural body 41 through the stiffening structure 113. Since each pillar 36 is configured to carry a bias signal (actuation) of the respective actuator 56, these two pillars 36 are electrically insulated from each other.

In the event that more than two pillars are present for each actuator 56, as in the examples illustrated and described below (e.g., FIG. 3 and FIG. 4), some of these pillars are not electrically active during use, i.e., they are not electrically coupled to any actuator 56, but have the exclusive function of stiffening the structural body 41.

In one embodiment, one of the drive electrodes of the actuator 56 (e.g., bottom electrode) is common to all the actuators 56, i.e., it extends with structural and electrical continuity throughout the entire structural body 41, in contact with all the piezoelectric elements of all the actuators 56 (and electrically insulated from further present conductive structures). In this case it is possible to provide a single bias path for this common electrode, this bias path including a single pillar 36 arranged in any region of the structural body 41 (not necessarily in proximity to a specific actuator 56).

Alternatively, it is possible to provide a plurality of conductive paths for contextually biasing the common electrode.

In a different embodiment, each actuator 56 is provided with own top and bottom electrodes not shared with other actuators 56. In this case, at least two respective pillars 36 are provided for each actuator 56 to carry the bias signal to the top and bottom electrodes.

Figure 3:
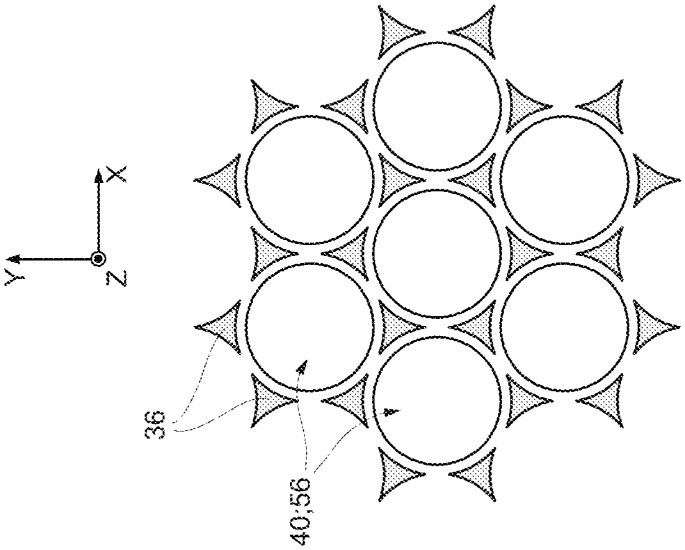

FIG. 3 illustrates, in top-plan view (on the XY plane), a generic plurality of membranes 40 with respective transducers 56, arranged to form a pattern defined during the design step. In the embodiment of FIG. 3, this pattern is a honeycomb pattern, i.e., the transducers 56 arranged along rows which extend along the X axis and which are parallel to each other along the Y axis; however the transducers 56 are not aligned along columns parallel to the Y axis.

Figure 4:
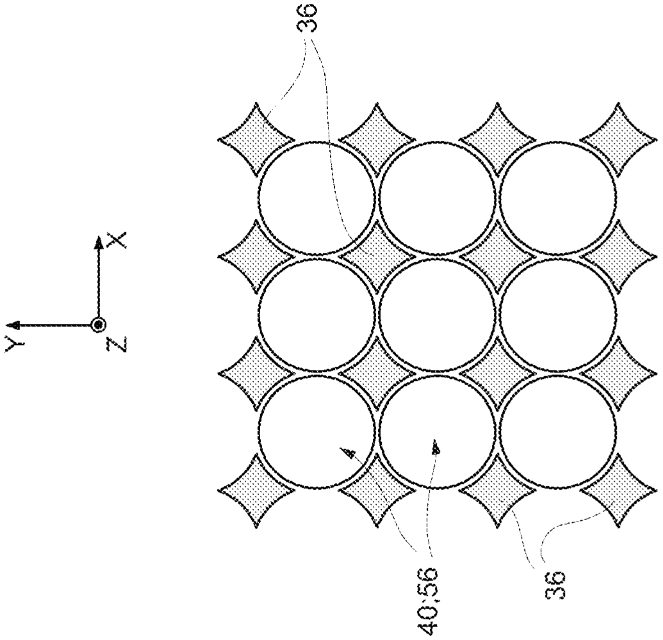
FIGS. 3 and 4 show respective embodiments of mutual arrangement patterns of transducers and electrical coupling elements of the MEMS device of FIG. 1A and of FIG. 1B.

In a further embodiment, FIG. 4, this pattern is a matrix wherein the transducers 56 are arranged to form rows along the X axis and columns along the Y axis. Each transducer 56 (matrix 40) is located at the intersection of a respective row and a respective column.

Although in FIGS. 3 and 4 the pillars have a hypocycloid-shaped section with three and, respectively, four cusps, this shape has not to be understood as limiting. Other shapes are possible (see FIGS. 2A-2D and in general the previous description). The transducers 56 are arranged in vicinity (adjacent) to each other, to form the aforementioned arrangement pattern with the pillars 36 and the stiffening structure 113 arranged therebetween which separate the various membranes 40, according to the various possible embodiments described.

In one embodiment, each membrane 40 and each actuator 56 have a circular shape, in top-plan view (on the XY plane). The diameter of each membrane 40 is comprised between 10 μm and 200 μm; the diameter of each actuator 56 is comprised between 7 μm and 150 μm.

The shape topology proposed for the pillars 36 allows the clamping area to be increased and the undesired bending modes to be shifted outside the operating bandwidth.

The electroacoustic device 1 may be manufactured based on the following process.

The process described refers to the manufacture of a single membrane provided with a single transducer. However, it is clear that this teaching applies to the manufacture of any plurality of membranes and relative transducers.

FIGS. 5A-5M are lateral sectional view on the XZ plane, in the same reference system of FIG. 1A.

Figure 5A:
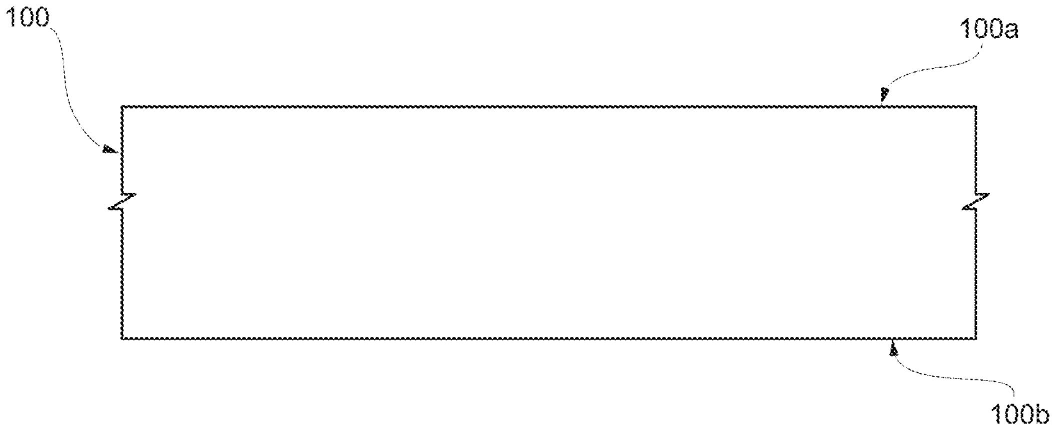

With reference to FIG. 5A, a wafer 100 of semiconductor material, such as for example silicon, is arranged. The wafer 100 has a front side or surface 100*a* and a rear side or surface 100*b*, opposite to each other along the Z axis. The wafer 100 has, for example, a thickness, along the Z axis, equal to about 400 μm between the front side 100*a* and the rear side 100*b*.

Figure 5B:
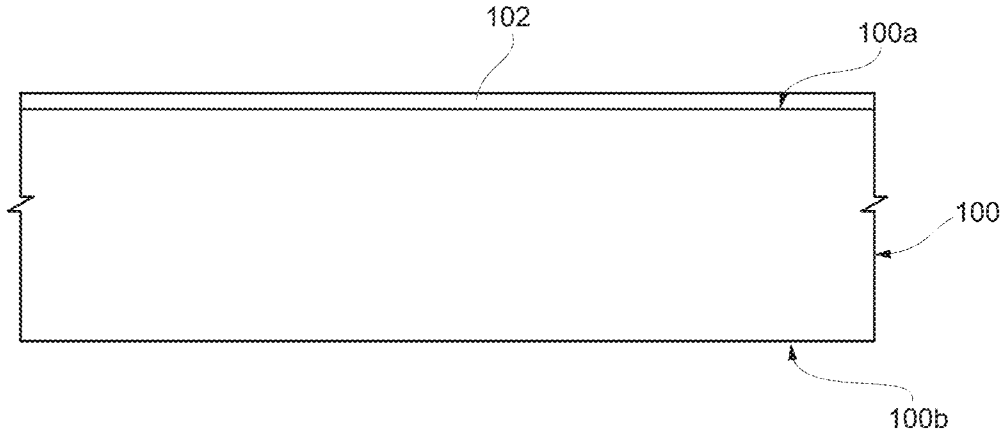

Then, FIG. 5B, a step of forming an etch stop layer 102 on the front side 100*a* is performed. The etch stop layer 102 is of a material that is selectively etchable with respect to the material of the wafer 100 (for example of deposited or thermally grown Silicon Oxide, or TEOS) and has a thickness comprised between about 0.3 μm and about 0.7 μm (e.g., equal to 0.5 μm).

Figure 5C:
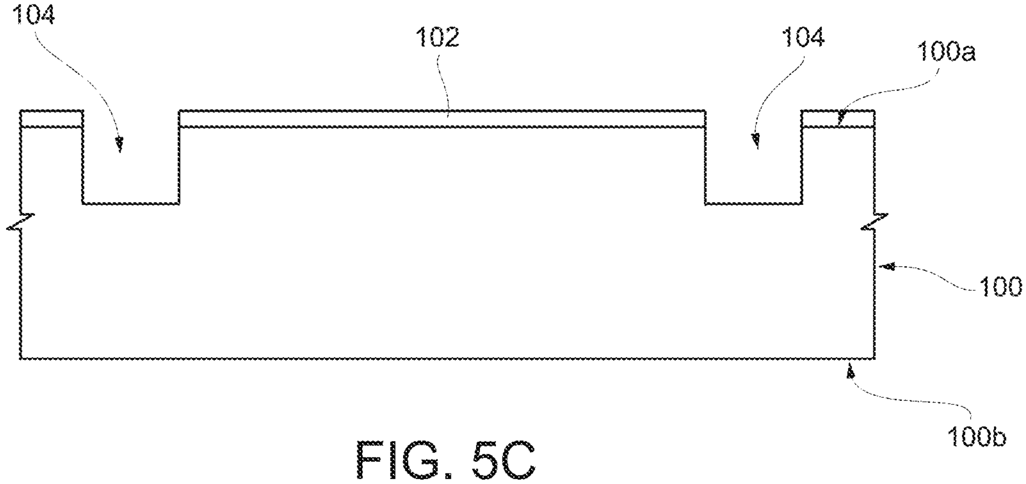

Then, FIG. 5C, selective portions of the wafer 100 (including a portion of the layer 102 and an underlying portion of the wafer 100) are removed using per se known lithography techniques, thus forming a lateral groove 104 surrounding a protruding portion 106 having, in top-view, shape and dimensions equal to those of the membrane 40 to be formed. The groove 104 ends or terminates inside the wafer 100. By way of example, the groove 104 has, in the wafer 100, a depth (along a direction parallel to the Z axis) of about 5 μm and a width (along the X axis) equal to about 5 μm.

Figure 5D:
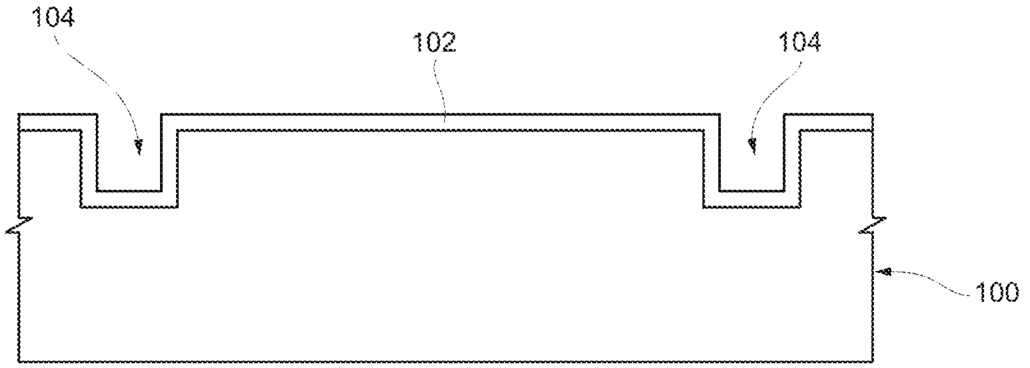

Then, FIG. 5D, the etch stop layer 102 is restored or formed inside the groove 104, for example by thermal growth of Silicon Oxide (or other material according to what has already been described with reference to FIG. 5B).

Figure 5E:
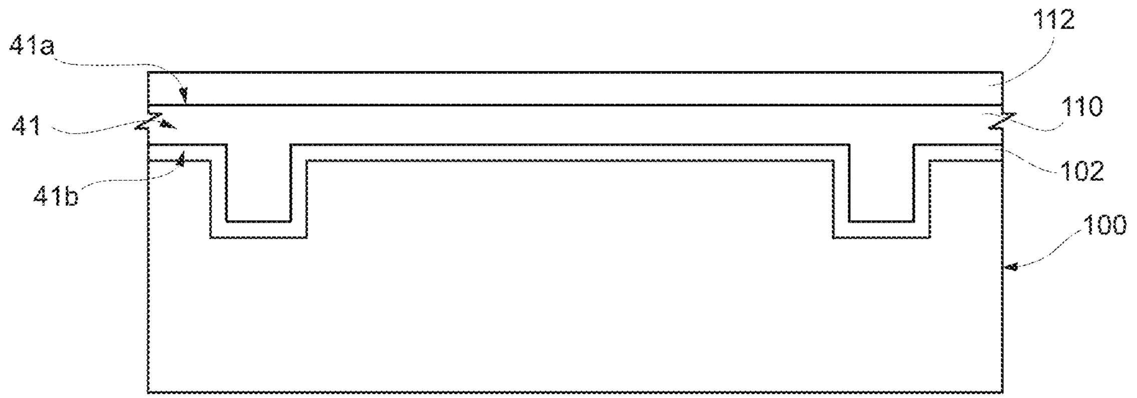
Figure 5F:
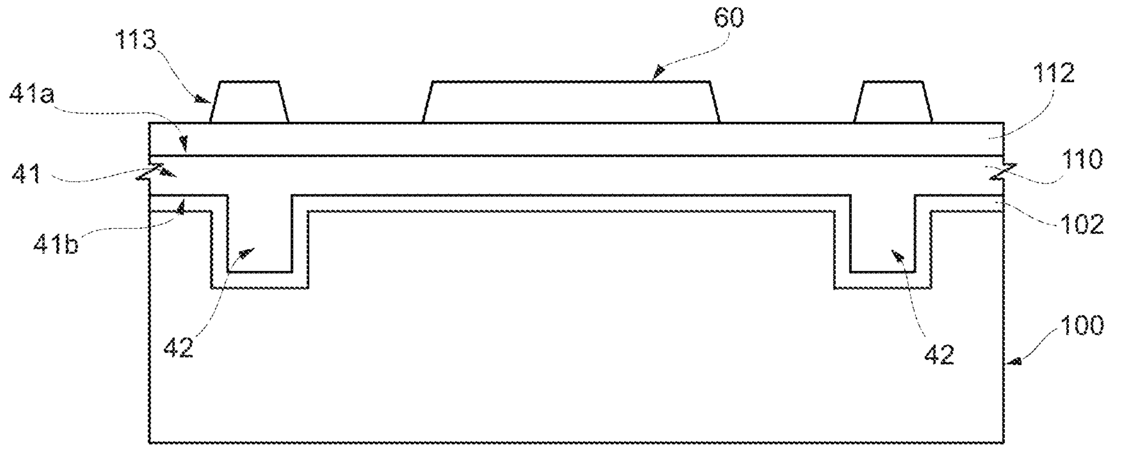

Then, FIG. 5E, a step of forming a structural layer 110 above the front side 100*a*, in particular above the etch stop layer 102, is performed. The structural layer 110 is, in one embodiment, of the same material as the wafer 100, here of Silicon. The structural layer 110 may be formed by Silicon epitaxial growth. The structural layer 110 has a thickness for example comprised between 3 μm and 100 μm; in particular equal to 10 μm. In some embodiments, the thickness of the structural layer 110 is equal to the upper and lower ends of this range. Then, the thickness of the structural layer 110 is reduced by a CMP (Chemical-Mechanical-Planarization) step, up to reaching a final thickness of the structural layer 110 comprised between 3 μm and 20 μm, in particular equal to 4 μm. In some embodiments, the thickness of the structural layer 110 is equal to the upper and lower ends of this range Then, FIG. 5F, an insulating or dielectric layer 112 (which, hereinafter will become the layer 58 of FIG. 1A, 1B), for example of Silicon Oxide, having a thickness between 0.5 μm and 3 μm, in particular equal to 1 μm, is formed on the structural layer 110.

A step of forming the actuator 56 and the stiffening structure is then performed.

Figure 6:
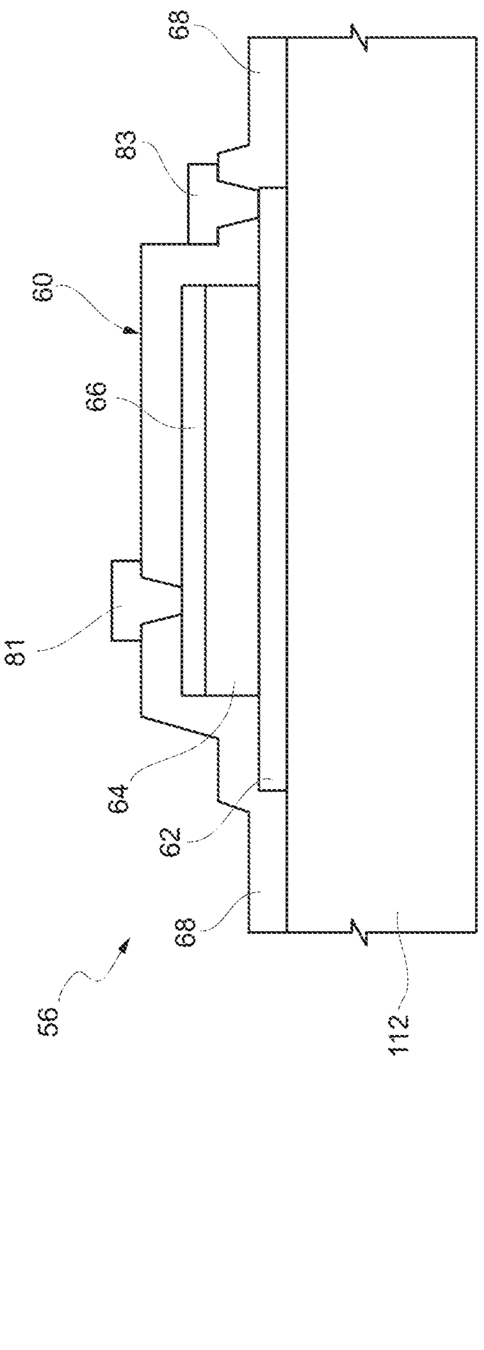
FIG. 6 illustrates a transducer implementable in the MEMS device of FIGS. 1A, 1B, and 5F-5M.

In one embodiment (exemplified in FIG. 6), the actuator 56 is of the piezoelectric type and, in a per se known manner, is formed by a stack 60 comprising: a first electrode 62 of electrically conductor material, for example of titanium (Ti) or platinum (Pt); a piezoelectric material layer 64, for example PZT (Pb, Zr, $TiO_3$) on the first electrode 62, in electrical contact therewith; a second electrode 66, for example of TiW (titanium and tungsten alloy) on the piezoelectric layer 64, in electrical contact therewith; and a dielectric layer 68, for example of silicon oxide and silicon nitride deposited by CVD to protect the electrodes 62, 66 and the piezoelectric layer 64. In particular, the dielectric layer 68 extends on the sides of the piezoelectric material layer 64 and electrically insulates it from the conductive tracks 81, 83 which are in electrical contact respectively with the first and the second electrodes 62, 66 (and used to carry the electrical actuation signals of the membrane and/or to receive the transduced signal during the reception step).

As said, the stiffening structure 113 extends (in sectional view) laterally to the stack 60 and (in top-plan view) surrounds at least partially (completely, in the represented embodiment) the actuator 56 and the membrane 40.

The stiffening structure 113 is, in one embodiment, formed by the same stack 60 previously described, in order to optimize the manufacturing steps.

However, it is apparent that the manufacturing process may provide a stiffening structure of other material, a semiconductor and insulating material stack.

Figure 5G:
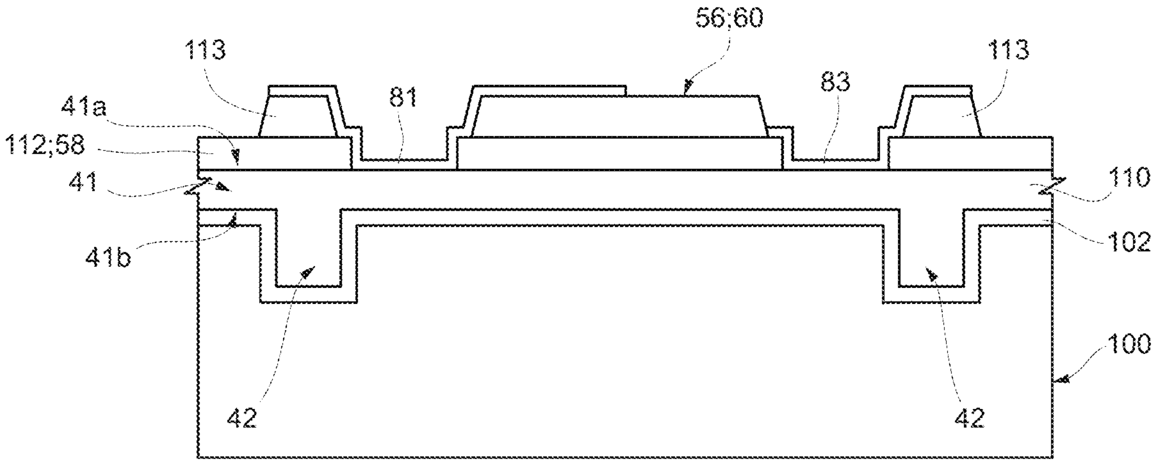

Then, FIG. 5G, the insulating layer 112 is patterned so as to remove selective portions of the same which extend between the piezoelectric stack (actuator 56) and the stiffening structure 113 with the respective pillars 36. Trenches 116 are thus formed which extend through the insulating layer 112 throughout the entire thickness of the same, up to reaching the underlying structural layer 110. The layer 58 of FIG. 1A, 1B is thus formed.

The conductive tracks 81, 83, of metal material, are formed in this step, in a per se evident manner, by deposition and lithography steps.

Figure 5H:
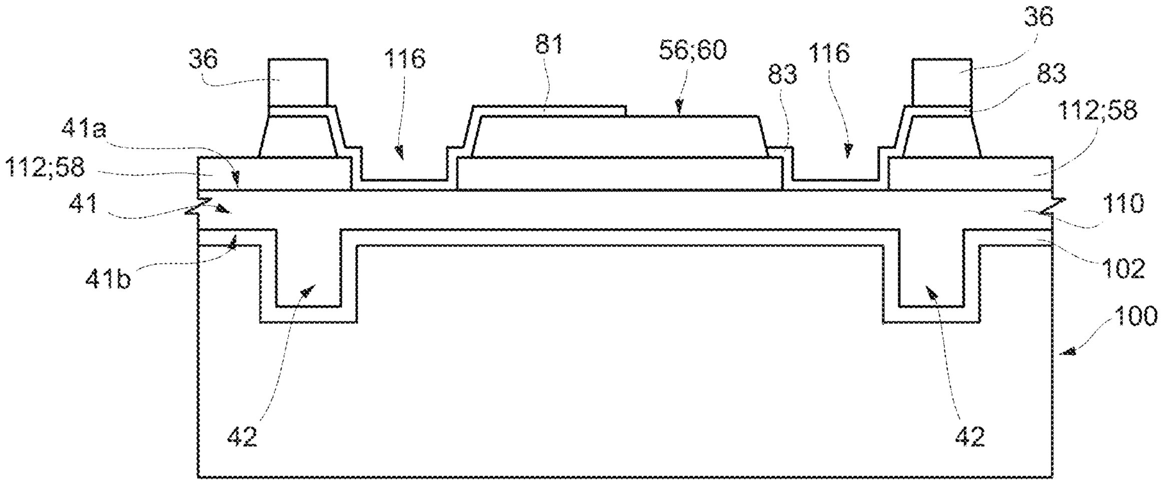

Then, FIG. 5H, the pillars 36 are formed above the stiffening structure 113 and the respective conductive tracks 81, 83. The step of forming the pillars 36 comprises depositing a metal material layer, for example gold, and performing lithography and etching steps of the metal layer using an etching mask patterned so as to define the section designed for the pillars 36 (e.g., one of the sections previously described and illustrated in FIGS. 2A-2D).

Alternatively to what has been represented in FIGS. 5G and 5H and described, the conductive tracks 81, 83 may extend laterally to the pillars 36, in lateral electrical contact with the pillars 36, and not therebelow. In this case, the conductive tracks 81, 83 may be formed in a different manufacturing step with respect to what has been illustrated.

Figure 5I:
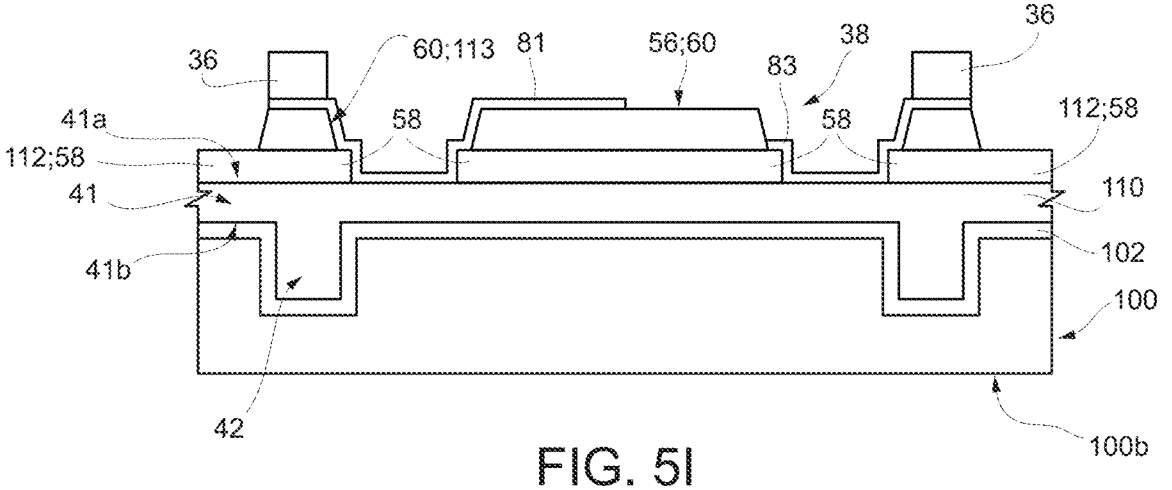

Then, FIG. 5I, the wafer 100 is thinned at the rear side 100*b*, up to reaching a thickness equal to about 100 μm.

Figure 5L:
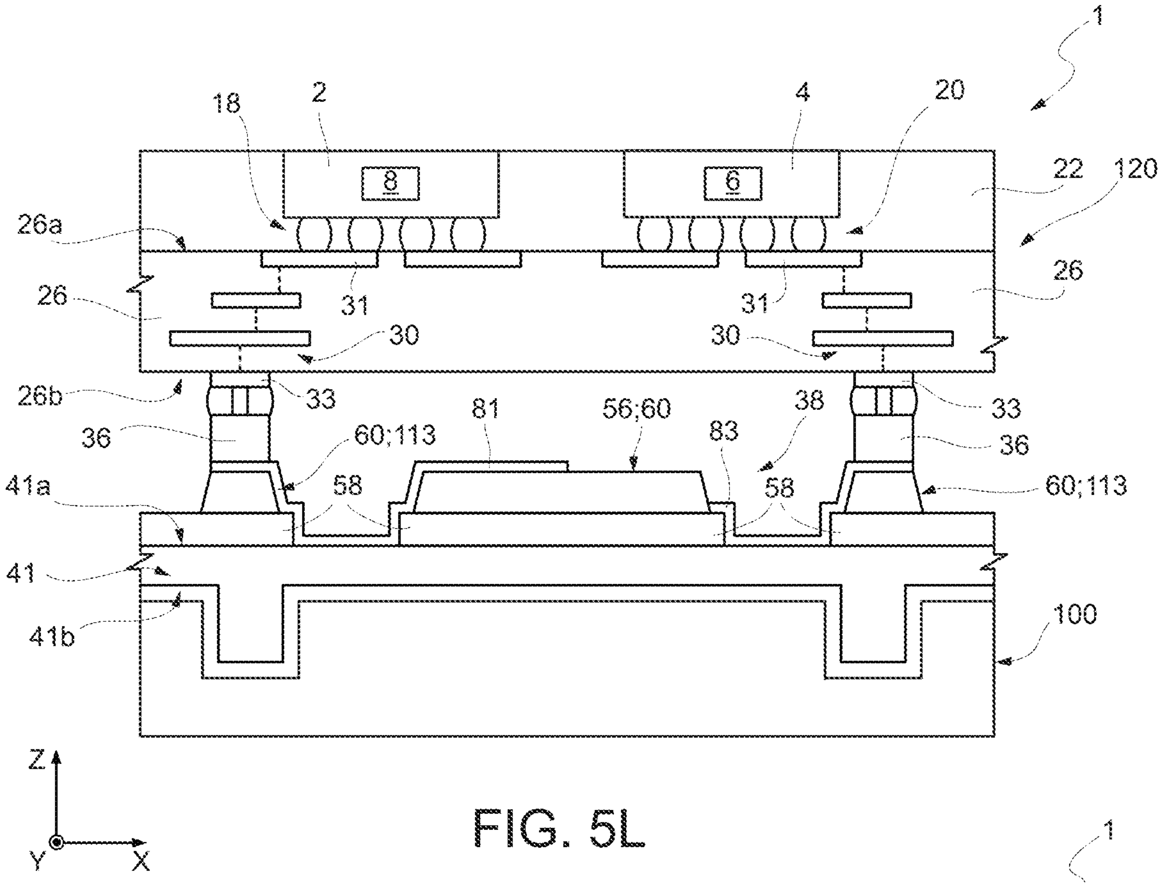

Subsequently, as shown in FIG. 5L, the wafer 100 (as processed up to the step of FIG. 5I) is physically and electrically coupled to an ASIC assembly 120 through the pillars 36; the ASIC assembly 120 includes the redistribution structure 26 and the first and the second dice 2, 4 coupled to each other by the bumps 18, 20. The ASIC assembly 120 is then arranged overlapped, along the Z axis, on the wafer 100 (in particular above the front side 100*a*). It should also be noted that the ASIC assembly 120 may be purchased already manufactured, and coupled to the pillars 36 by soldering or bonding techniques known per se.

Without any loss of generality, the manufacture of the ASIC assembly 120 may occur by so-called FOWLP- ("fan out wafer level package") type processing techniques. In this regard, the first and the second dice 2, 4 may be manufactured in a per se known manner, adopting so-called wafer-level manufacturing technologies, which indeed allow manufacturing, starting from a same semiconductive wafer (not shown), a plurality of dice, and subsequently separating (singulating) these dice from each other, by dicing operations. After a possible testing step, the dice thus formed are mechanically coupled again, through coupling with the redistribution structure 26, so as to form indeed the ASIC assembly 120. In practice, the ASIC assembly 120 is formed by an assembly of dice fixed to each other, after having been previously singulated, in such a way that this assembly has, as a first approximation, the shape of a wafer (in particular, of the wafer 100), in the sense that it may be superimposed on and coupled to the wafer 100, as described. In other words, the ASIC assembly 120 represents a kind of "reconstructed wafer". Furthermore, the dice of the ASIC assembly 120 share a single redistribution structure 26.

Figure 5M:
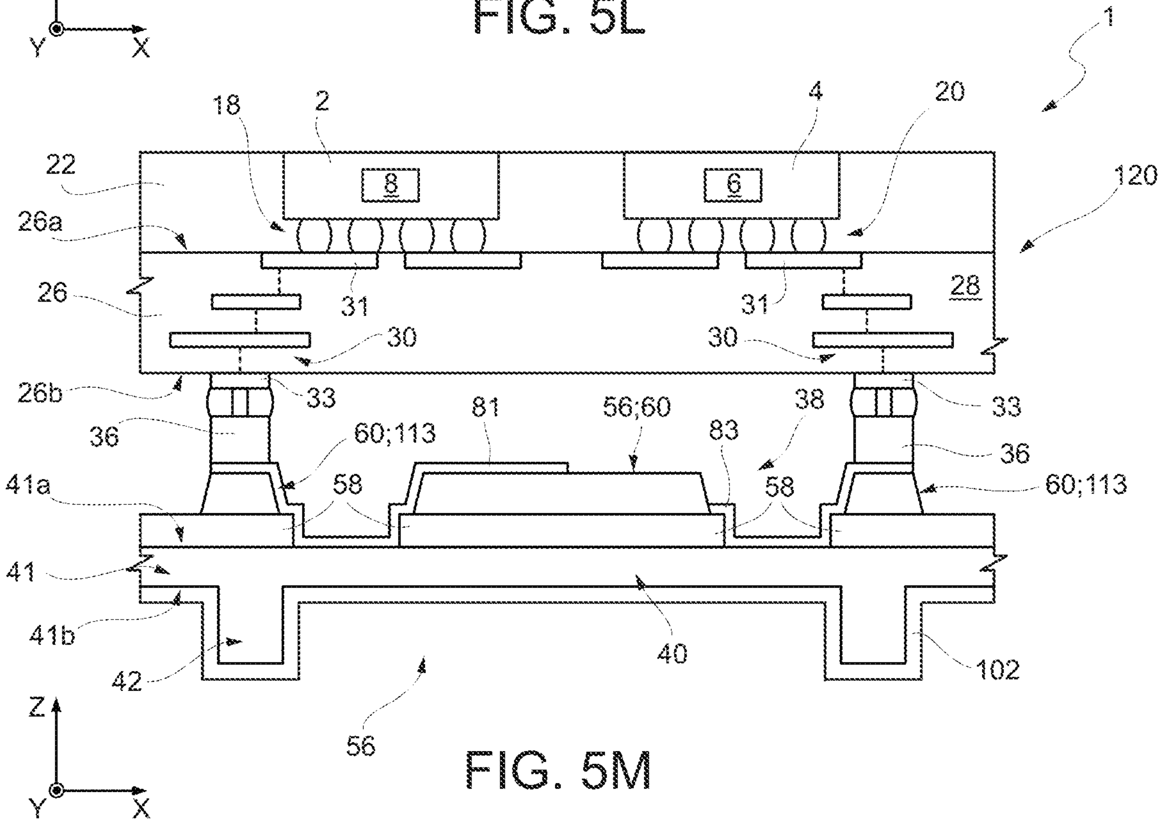

Then, FIG. 5M, the wafer 100 is etched at the rear side 100*b*, to completely remove the material of the wafer 100 up to reaching the etch stop layer 102. The thick portions 42 and the membrane portions 40 are thus formed, separated from each other by the recesses 52. The solid body also comprises, in this example, the etch stop layer 102. However, it is apparent that the etch stop layer 102 may be removed by wet etching, if useful or necessary.

Dicing (singulation) steps may then be performed, in a manner not illustrated. In particular, the scribe lines extend laterally to the pillars 36, i.e., in a zone of the wafer 100 which does not have membranes 40, nor actuators 56, nor pillars 36, and is also external to the overlapping region (along the Z axis) between the wafer 100 and the ASIC assembly 120.

The advantages that the present manufacturing process affords are clear from the previous description.

In particular, the device of the present disclosure is capable of reaching, during use, high vibration frequencies (about 10 MHz) without compromising the performances.

Finally, it is clear that modifications and variations may be made to the manufacturing process described and illustrated herein, without thereby departing from the scope of the present disclosure, as defined in the attached claims.

For example, each electroacoustic device may comprise a different number of dice from what has been shown, in which case the manufacturing process modifies accordingly. The transmission and reception circuits may be formed in different dice; in this case, the transmission and reception circuits may be formed by using different technologies.

In general, the actuators may be of a different type with respect to what has been described. For example, the actuators may implement an electrostatic, rather than a piezoelectric, actuation mechanism. Similarly, also the arrangement of the actuators with respect to the corresponding membranes may be different from what has been described.

Furthermore, in lieu of the bumps 18, 20 other conductive connection elements may be used, such as for example corresponding pillars. More generally, all the conductive connection elements described herein are purely exemplary.

Furthermore, each pillar 36 may be, in general, a hypocycloid with a number of cusps equal to or greater than three (e.g., five).

Furthermore, the shape of each pillar 36 may be different for pillars 36 which are different from each other.

A MEMS device (1) of the present disclosure may be summarized as including: a signal processing assembly (120); a transduction module (38) including a plurality of transducer devices (56) mutually arranged to form an arrangement pattern of transducer devices (56) adjacent to each other and separated from each other by surface regions of the transduction module (38); a stiffening structure (113) at said surface regions of the transduction module, at least partially surrounding each transducer device (56) of said plurality of transducer devices (56); a plurality of conductive coupling elements (36) extending on the stiffening structure (113) and configured to physically and electrically couple the transduction module (38) to the signal processing assembly (120), each conductive coupling element (36) being physically separated and electrically insulated from the other conductive coupling elements (36); and a plurality of first conductive tracks (81; 83), each of them electrically connected to a transducer device (56) and to a respective conductive coupling element (36), characterized in that said conductive coupling elements have a respective section with a shape such as to maximize the overlapping surface with the stiffening structure (113) about the respective transducer device (56).

Said conductive coupling elements (36) may have a section with a shape of: hypocycloid, with a number of cusps equal to or greater than three; triangular; quadrangular.

Said arrangement pattern may be of matrix or honeycomb type.

When said arrangement pattern is of matrix type, the matrix may include rows and columns, each transducer device (56) being arranged at the intersection of a respective row and a respective column of said matrix, and wherein each transducer device (56) is surrounded by four conductive coupling elements (36); and when said arrangement pattern is of honeycomb type, each transducer device (56) may be surrounded by six conductive coupling elements (36).

Each transducer device (56) may include a respective membrane (40) and a respective transducer element integral with said respective membrane (40), and wherein each transducer element may be electrically controllable by the signal processing assembly (120) to cause a deformation of the corresponding membrane (40).

Each transducer element (56) may include a multilayer, or stack, (60) including: a bottom electrode (62), of conductive material; a piezoelectric layer (64) on, and in electrical contact with, the bottom electrode; and a top electrode (66), on the piezoelectric layer and in electrical contact with the piezoelectric layer, wherein a respective first conductive track (81) between said plurality of first conductive tracks, is in electrical contact with the top electrode (66) and with a respective conductive coupling element (36).

Said bottom electrode (62) may be an electrode shared between said plurality of transducer elements (56), further including a second conductive track further with respect to said plurality of first conductive tracks (81; 83), the second conductive track being coupled to said bottom electrode (62) and to a conductive coupling element (36) further with respect to said plurality of conductive coupling elements (36).

Said multilayer (60) may further include an insulating layer (68) on the top electrode (66), and wherein the stiffening structure (113) may include said multilayer (60).

The device may further include a plurality of second conductive tracks (83; 81), each of said second conductive tracks being electrically coupled to a respective bottom electrode (62) and to a respective conductive coupling element (36).

The stiffening structure (113) may completely surround each transducer device (56), and wherein each conductive coupling element (36) may completely surround a respective transducer device (56).

The conductive coupling elements (36) may be equal in number to two, and wherein, for each transducer device (56), one of the two conductive coupling elements (36) may have a section having a shape of: hypocycloid, with a number of cusps equal to or greater than three; triangular;

quadrangular, and wherein the other of the two conductive coupling elements (36) may have a section such as to maximize the overlapping surface with the stiffening structure (113) around the respective transducer device (56), where the stiffening structure is free from said one conductive coupling element (36).

The conductive coupling elements (36) may have an elongated shape with an extension direction along an axis (Z), said section being taken on a plane (XY) orthogonal to said axis (Z).

The stiffening structure (113) may be a multilayer having a thickness comprised between 1 μm and 50 μm.

The signal processing assembly (120) may include a redistribution structure (26) provided with a first side (26*a*) and a second side (26*b*) opposite to each other, and with redistribution conductive paths (30) which extend between the first side and the second side, and wherein the redistribution structure (26) may face the transduction module (38) by the second side (26*b*) and is provided, at the second side, with connection pads (33) electrically coupled between respective conductive paths (30) and respective conductive coupling elements (36).

The signal processing assembly (120) may further include a control module (2, 4, 22), said redistribution structure (26) being provided, at the first side, with further connection pads (31) electrically coupled to respective conductive paths (30), and the control module (2, 4, 22) being arranged facing the first side (26*a*) of the redistribution structure (26) and being electrically coupled to said further connection pads (31).

The conductive coupling elements (36), the connection pads (33), the redistribution conductive paths (30), and the further connection pads (31) may form a plurality of conductive paths configured to carry electrical signals between the control module (2, 4, 22) and the transduction module (38).

Said MEMS device (1) may be an ultrasound transducer device, or PMUT.

A method of manufacturing a MEMS device of the present disclosure may be summarized as including the steps of: forming a transduction module (38), including forming a plurality of transducer devices (56) mutually arranged according to an arrangement pattern of transducer devices (56) adjacent to each other and separated from each other by surface regions of the transduction module (38); forming a stiffening structure (113) at said surface regions of the transduction module, at least partially surrounding each transducer device (56) of said plurality of transducer devices (56); forming a plurality of conductive coupling elements (36) on the stiffening structure (113), each conductive coupling element (36) being configured to physically and electrically couple the transduction module (38) to the signal processing assembly (120), and being physically separated and electrically insulated from the other conductive coupling elements (36); forming a plurality of first conductive tracks (81; 83), each of them electrically connected to a transducer device (56) and to a respective conductive coupling element (36); and coupling a signal processing assembly (120) to said plurality of conductive coupling elements (36), characterized in that said conductive coupling elements (36) have a section with a shape such as to maximize the overlapping surface with the stiffening structure (113) around the respective transducer device (56).

Forming each transducer device (56) may include forming a respective membrane (40) and a respective transducer element integral with said respective membrane (40), and wherein forming each respective membrane may include: forming, in a semiconductor body (100), an etch stop layer (102); forming, on the etch stop layer, a structural layer (110); forming, on the structural layer, an insulation layer (112); forming, on the insulation layer, said respective transducer element (56) and said first connection pads associated with said respective transducer element (56), the first connection pads being arranged laterally to the respective transducer element (56); removing selective portions of the insulation layer which extend between the transducer element (56) and the first connection pads; and completely removing the semiconductor body (100) exposing the etch stop layer (102).

The method may further include the step of forming supports (42) for each membrane (40), including the steps of: forming a respective trench (104) in the semiconductor body, said trench externally delimiting the shape of the respective membrane (40) and having a closed circular or polygonal shape; forming the etch stop layer (102) on the semiconductor body and in said trench (104); and forming the structural layer (110) on the etch stop layer (102) which extends both on the semiconductor body and in said trench.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS device, comprising:
a signal processing assembly;
a transduction module including a plurality of transducer devices mutually arranged to form an arrangement pattern of transducer devices adjacent to each other and separated from each other by surface regions of the transduction module;
a stiffening structure at the surface regions of the transduction module, at least partially surrounding each respective transducer device of the plurality of transducer devices;
a plurality of conductive coupling elements extending on the stiffening structure, the plurality of conductive coupling elements physically and electrically couple the transduction module to the signal processing assembly, each respective conductive coupling element of the plurality of conductive coupling elements being physically separated and electrically insulated from each other; and
a plurality of first conductive tracks, each respective conductive track of the plurality of conductive tracks is electrically connected to at least one corresponding transducer device of the plurality of transducer devices and to at least one corresponding conductive coupling element of the plurality of conductive coupling elements,
wherein the plurality of conductive coupling elements have a respective section with a shape to maximize overlapping with the stiffening structure.

2. The device according to claim 1, wherein one or more respective conductive coupling elements of the plurality of conductive coupling elements have a section with at least one of the following of a hypocycloid shape having a number of cusps equal to or greater than three, a triangular shape, or a quadrangular shape.

3. The device according to claim 1, wherein the arrangement pattern is of a matrix type, the matrix type includes rows and columns and each respective transducer device of the plurality of transducer devices is arranged at the intersection of a respective row and a respective column of the rows and columns, and each respective transducer device of the plurality of transducer devices is surrounded by four conductive coupling elements.

4. The device of claim 1, wherein the arrangement pattern is of a honeycomb type, and each respective transducer device of the plurality of transducer devices is surrounded by six conductive coupling elements.

5. The device according to claim 1, wherein each respective transducer device of the plurality of transducer devices includes a respective membrane and a respective transducer element integral with the respective membrane, and
wherein each respective transducer element is electrically controllable by the signal processing assembly to cause a deformation of a corresponding membrane of the membranes of the plurality of transducer devices.

6. The device according to claim 5, wherein each respective transducer element of the transducer elements of the plurality of transducer devices includes a multilayer including:
a bottom electrode, of conductive material;
a piezoelectric layer on, and in electrical contact with, the bottom electrode; and
a top electrode, on the piezoelectric layer and in electrical contact with the piezoelectric layer,
wherein a respective first conductive track of the plurality of first conductive tracks is in electrical contact with the top electrode and with a respective conductive coupling element of the plurality of conductive coupling elements.

7. The device according to claim 6, further comprising a second conductive track further with respect to the plurality of first conductive tracks, the second conductive track being coupled to the bottom electrode and to another respective conductive coupling element of the plurality of conductive coupling elements, and wherein the bottom electrode is shared between the plurality of transducer elements.

8. The device according to claim 6, wherein:
the multilayer further includes an insulating layer on the top electrode; and
the stiffening structure includes the multilayer.

9. The device according to claim 6, further comprising a plurality of second conductive tracks, each respective second conductive track of the plurality of second conductive tracks being electrically coupled to a respective bottom electrode and to a respective conductive coupling element.

10. The device according to claim 1, wherein the stiffening structure completely extends around each respective transducer device of the plurality of transducer devices, and wherein each respective conductive coupling element of the plurality of conductive coupling elements completely extends around a corresponding transducer device of the plurality of transducer devices.

11. The device according to claim 1, wherein the conductive coupling elements are equal in number to two, and
wherein, for each transducer device, one of the two conductive coupling elements has a section having a shape of: hypocycloid, with a number of cusps equal to or greater than three, and
wherein the other of the two conductive coupling elements has a section such as to maximize overlapping with the stiffening structure.

12. The device according to claim 1, wherein:
the signal processing assembly includes a redistribution structure having a first side, a second side opposite to the first side, redistribution conductive paths that extend between the first side and the second side,
the second side of the redistribution structure faces the transduction module, and connection pads of coupled to the redistribution structure are electrically coupled between respective redistribution conductive paths of the redistribution conductive paths and respective conductive coupling elements of the plurality of conductive coupling elements.

13. The device according to claim 12, wherein the signal processing assembly further includes a control module,
the redistribution structure having further connection pads at the first side and electrically coupled to respective redistribution conductive paths of the redistribution conductive paths, and
the control module being arranged facing the first side of the redistribution structure and being electrically coupled to the further connection pads.

14. The device according to claim 13, wherein the conductive coupling elements, the connection pads, the redistribution conductive paths, and the further connection pads form a plurality of conductive paths configured to carry electrical signals between the control module and the transduction module.

15. The device according to claim 1, wherein the MEMS device is an ultrasound transducer device, or PMUT.

16. A method of manufacturing a MEMS device, comprising:

forming a transduction module including forming a plurality of transducer devices mutually arranged according to an arrangement pattern of transducer devices adjacent to each other and separated from each other by surface regions of the transduction module;

forming a stiffening structure at the surface regions of the transduction module to at least partially surround each transducer device of the plurality of transducer devices;

forming a plurality of conductive coupling elements on the stiffening structure, each conductive coupling element of the plurality of conductive coupling elements physically and electrically couples the transduction module to a signal processing assembly, and each conductive coupling element of the plurality of conductive coupling elements being physically separated and electrically insulated from each other;

forming a plurality of first conductive tracks, each first conductive track of the plurality of conductive tracks is electrically connected to a respective transducer device of the plurality of transducer devices and to a respective conductive coupling element of the plurality of conductive coupling elements; and coupling the signal processing assembly to the plurality of conductive coupling elements, wherein each respective conductive coupling element of the plurality of conductive coupling elements has a section with a shape such as to maximize overlapping of the stiffening structure at least one corresponding transducer device of the plurality of transducer devices.

17. The method according to claim 16, wherein forming each respective transducer device of the plurality of transducer devices includes forming a respective membrane and a respective transducer element integral with the respective membrane, and wherein forming each respective membrane includes:

forming, in a semiconductor body, an etch stop layer;

forming, on the etch stop layer, a structural layer;

forming, on the structural layer, an insulation layer;

forming, on the insulation layer, the respective transducer element and first connection pads associated with the respective transducer element, the first connection pads being arranged laterally to the respective transducer element;

removing selective portions of the insulation layer which extend between the transducer element and the first connection pads; and completely removing the semiconductor body exposing the etch stop layer.

18. The method according to claim 17, further comprising forming supports for each membrane including:

forming a respective trench in the semiconductor body, the trench externally delimiting the shape of the respective membrane and having a closed circular or polygonal shape;

forming the etch stop layer on the semiconductor body and in the trench; and forming the structural layer on the etch stop layer which extends both on the semiconductor body and in the trench.

19. A device, comprising:

a structural body including:

a semiconductor layer including a first surface and a second surface opposite to the first surface;

a membrane of the semiconductor layer having a first thickness;

an insulating layer on the first surface and overlapping with the membrane;

a thick portion of the semiconductor layer having a second thickness greater than the first thickness, the thick portion spaced laterally outward from the thick portion;

an actuator on the insulating layer and overlapping with the membrane, the actuator including a first side on the insulating layer, a second side opposite to the first side and spaced apart from the insulating layer, a first electrode at the first side, and a second electrode at the second side;

a stiffening structure extends around the actuator, the stiffening structure is on the insulating layer;

a first conductive track extends along the first surface of the semiconductor layer, the insulating layer, the stiffening structure and the actuator, the first conductive track is coupled to the first electrode;

a second conductive track extends along the first surface of the semiconductor layer, the insulating layer, the stiffening structure, and the actuator, the second conductive track is coupled to the second electrode; and a first conductive coupling element coupled to a portion of the first conductive track on the stiffening structure, the first conductive coupling element having a shape selected from at least one of the following of a hypocycloid shape having a number of cusps equal to or greater than three, a triangular shape, or a quadrangular shape; and a second conductive coupling element coupled to a portion of the second conductive track on the stiffening structure, the second conductive coupling element having a shape selected from at least one of the following of the hypocycloid shape having a number of cusps equal to or greater than three, the triangular shape, or the quadrangular shape.

20. The device of claim 19, wherein the shape of the first and second conductive coupling elements are the same.

* * * * *